United States Patent
Fosbinder et al.

(10) Patent No.: US 6,348,671 B1
(45) Date of Patent: Feb. 19, 2002

(54) WELDER WITH ENGINE POWER AND UTILITY POWER INPUT

(75) Inventors: Daniel Fosbinder, Appleton, WI (US); William Sullivan, Hawthorn Woods, IL (US); Richard Beeson, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/404,234

(22) Filed: Sep. 23, 1999

(51) Int. Cl.$^7$ ............................................... B23K 9/10
(52) U.S. Cl. ..................................................... 219/133
(58) Field of Search ............................ 219/133, 130.1, 219/134; 290/30 A, 30 B; 307/43, 47, 64, 65, 68, 80, 86

(56) References Cited

U.S. PATENT DOCUMENTS

| | | | | |
|---|---|---|---|---|
| 2,427,678 A | * | 9/1947 | Laging | 290/30 A |
| 3,778,633 A | * | 12/1973 | DeVisser et al. | 307/64 |
| 5,191,229 A | * | 3/1993 | Davis et al. | 307/64 |
| 5,250,786 A | * | 10/1993 | Kikuchi et al. | 219/133 |
| 5,410,126 A | * | 4/1995 | Miller et al. | 219/130.1 |
| 5,968,385 A | | 10/1999 | Beeson et al. | |

* cited by examiner

*Primary Examiner*—Clifford C. Shaw
(74) *Attorney, Agent, or Firm*—George R. Corrigan

(57) ABSTRACT

A method and apparatus for providing welding power includes a power supply that receives utility and engine power. The power supply has an engine power input and a utility power input. One of the engine power input and the utility power input is selectively connected to the power supply in response to a mode select input, controlled by an input selector. The input selector may include a user selectable input, such as a sensor circuit or a user switch on a welder control panel, preferably a three position switch having an engine mode position, a utility mode position and an off position in various alternatives. The engine is disabled when utility power is selected. Disabling the engine includes one or more of cutting the field current, starter current, and/or battery current. The power supply may include an inverter, chopper, and/or a phase controlled device. The welder is preferably a single-package, stand-alone welder, and/or includes an engine/generator having a welding and an auxiliary output.

35 Claims, 2 Drawing Sheets

WELDER WITH ENGINE POWER AND UTILITY POWER INPUT

FIELD OF THE INVENTION

The present invention relates generally to the art of welding power supplies. More specifically, it relates to welding power supplies that may be run off two types of electric power, such as utility power (or battery power) and generator power.

BACKGROUND OF THE INVENTION

Welding power supplies receive input power, and provide output power suitable for welding. It is known in the welding arts to provide utility power (230/460, 60 Hz, e.g.) as input power to the welding power supply. (Power supply, as used herein, refers to the circuitry which receives and converts or transforms power, as well as control circuitry and other ancillary circuitry associated therewith). Welding power supplies that receive utility power include phase controlled rectifiers (U.S. Pat. No. 4,038,515, e.g., hereby incorporated by reference), convertors (invertors, series resonant convertors, etc.) and transformers with rectifiers. A convertor-based welding power supply well-suited for utility power is described in U.S. Pat. No. 5,783,799 (hereby incorporated by reference), Series Resonant Converter, And Method And Apparatus For Control Thereof, issued Jul., 21, 1998, and assigned to the assignee of this invention.

Welding power supplies designed for utility power input generally receive a voltage close to the rated voltage (460 V e.g.), or one of a plurality of rated voltages. The current drawn is sufficient to provide the output power desired, When the desired output changes suddenly, the input power needed suddenly changes, and utility power is able to quickly respond. Welding power supplies are designed with this responsiveness in mind.

It is also known to provide the output of an engine-driven generator/alternator as the input to a welding power supply. Welding power supplies that receive a generator/alternator input also include phase controlled rectifiers, convertors (invertors, series resonant convertors, etc.) and transformers with rectifiers. One example of a welding power supply having an engine/generator is the Miller PipePro 304™, which is described in U.S. application Ser. No. 08/858,129, filed May 19, 1997, (hereby incorporated by reference), entitled Engine-driven Invertor With Feedback Control, and assigned to the assignee of this invention.

There are significant power limitations for engine-driven generator welding power supplies. For example, the input power from an engine-driven generator cannot instantly respond to sudden increases in needed input power, because, at least in some instances, the engine may take some time to increase its speed, thus providing the additional needed power. Additionally, it is desirable to cause or allow the engine to idle under some circumstances, so as to enhance fuel economy and reduce wear and tear. Welding power supplies designed for engine-driven generators are typically designed with these concerns in mind.

Engine-driven generator welding power supplies are often portable. Accordingly, they are at times used where utility power is unavailable, (outdoors, e.g.). Other times they are used where utility power or portable generator is available (indoors or near a shop, e.g.). However, because engine-driven generator welding power supplies are not designed for utility input, the engine must still be used to provide power. This may be costly (because engine power often costs more than utility power), noisy, and can create hazardous fumes indoors. Thus, sometimes the user has two welders: an engine-driven welding power supply to be where utility power is not available and a utility powered welding power supply to be used where utility power is available.

Given the expense of welding power supplies, it is desirable for a welding power supply to be capable of being powered by utility power (or some other source of power) and be capable of being powered by an engine-driven generator. Preferably, such a welding power supply will be designed to adequately operate with utility power input and with generator power input, given the different design considerations of the different input powers. Also, such a power supply will preferably be convertible from using one of engine and utility power to the other without having to unplug the power supply, or turn off the engine.

SUMMARY OF THE PRESENT INVENTION

According to a first aspect of the invention a welder includes a power supply having a power supply input and a power output. An input circuit has an engine power input and a utility power input. One of the engine power input and the utility power input is selectively connected to the power supply input in response to a mode select input. An input selector having an engine mode and a utility mode is connected to the mode select input.

The input selector includes a user selectable input, which may be a user switch on a welder control panel, and preferably a three position switch having an engine mode position, a utility mode position and an off position in various alternatives.

The engine/generator has an electrical output connected to the engine power input, and an engine disable input in another embodiment. The input circuit includes a disable output, and the disable output is connected to the disable input when the user switch is in the utility position. The disable input may include a field current cut-off circuit, a starter cut-off circuit, and/or a battery cut-off circuit, responsive to the disable output.

The power supply includes an inverter, chopper, and/or a phase controlled device in various embodiments.

The welder is a single-package, stand-alone, welder, and/or includes an engine/generator having an electrical output connected to the engine power input, and/or an auxiliary power output disposed to derive power from the engine/generator in other embodiments.

The input selector includes a sensor circuit, that senses and is responsive to the presence, absence or other parameter of utility power being provided to the utility power input in another embodiment.

According to a second aspect of the invention a method of providing welding power includes selecting an engine or utility mode, selecting between one of engine power input and utility power as an input power in response to the selected mode;, and converting the input power to welding power.

Selecting an engine or utility mode includes responding to a user selectable input, such as a user switch on a welder control panel, in various alternatives.

The method includes generating electrical power and providing the electrical power as the engine power input, when the engine mode is selected, and or disabling the generated output, for example by disrupting a field current or disrupting battery power, when the utility mode is selected in other alternatives.

Converting the input includes inverting the input or chopping the input in various embodiments.

Selecting an engine or utility mode includes sensing and responding to the presence, absence, or other parameter of utility power being provided to the utility power input and/or engine power input in various alternatives.

Other principal features and advantages of the invention will become apparent to those skilled in the art upon review of the following drawings, the detailed description and the appended claims.

Figure 1:
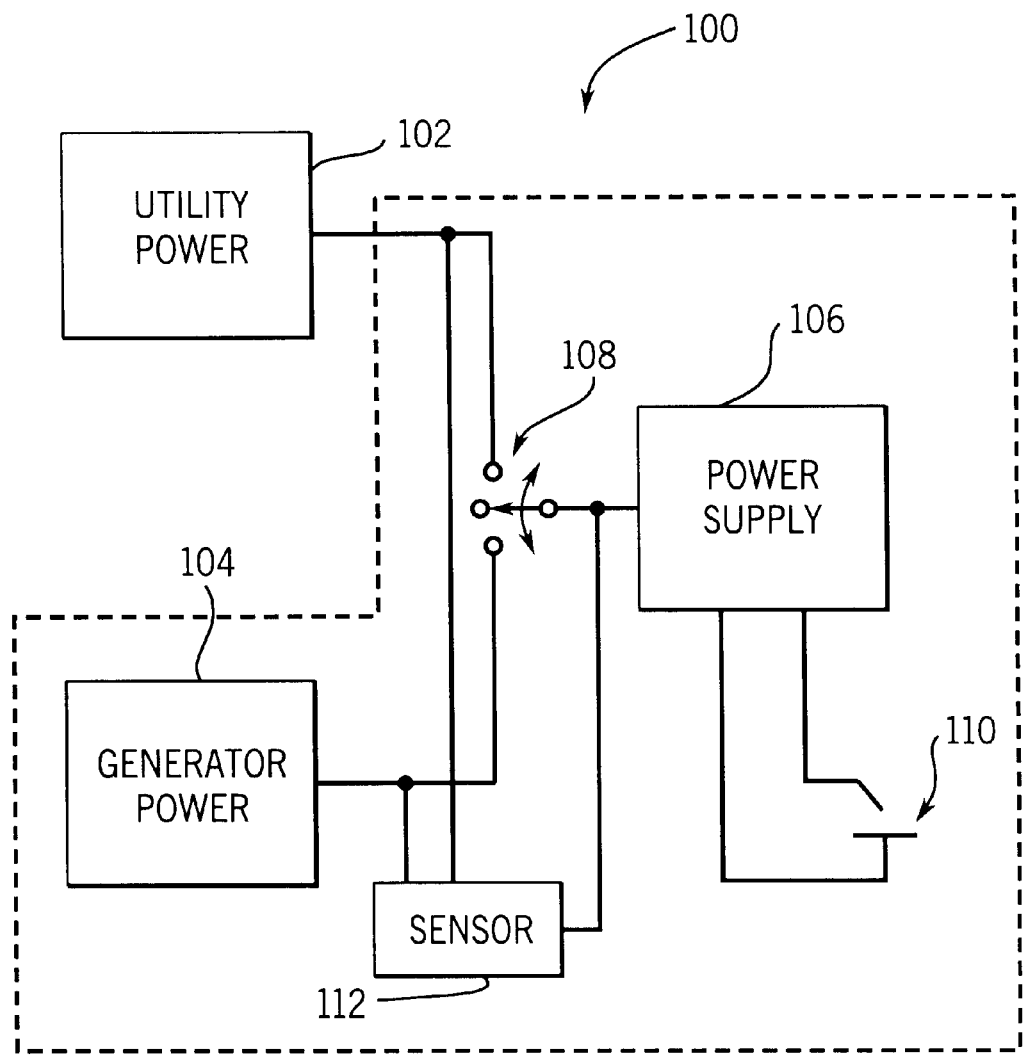
FIG. 1 is a block diagram of a welder constructed in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular welding power supply having a particular convertor, and a particular mode select circuit, it should be understood at the outset that the invention may also be implemented using other types of power supplies and other mode selectors.

Generally, the present invention includes a welding power supply that is adapted to receive either utility power or generator power as input power. The welding power supply transforms or converts the input power to a welding power output. Preferably, the welding power supply includes a user selector switch which allows the user to select between utility power, generator power and an off position. In alternative embodiments the welding power supply is adapted to receive either battery power or generator power, or two or more types of input power.

Referring now to FIG. 1, a block diagram of a welder 100 constructed in accordance with a present invention includes a power supply 106, a switch 108, a welding output 110, and an engine-driven generator 104. Also shown is a source of utility power 102. Switch 108 is a three position, user selectable switch, in the preferred embodiment, which allows the user to selectively connect utility power as an input or generator power as an input, or to turn the welder off. In the preferred embodiment when the user selects utility power, the engine is disabled. User selectable switch, as used herein, includes a switch or other device that allows the user to select an operating parameter. Selectively connect, as used herein, means to connect one of a plurality of inputs, but not all of the inputs, to an input receiving circuit.

In accordance with the preferred embodiment the engine-driven generator is the type of generator such as that found in the Miller PipePro 304™ and described in application Ser. No. 08/858,129. Power supply 106 is a convertor such as that found in the Miller PipePro 304™, and described in U.S. Pat. No. 5,783,799. Power supply 106 has been modified to have circuitry, including switch 108, that allows selection between utility power and generator power, and that disables the engine when utility power is provided.

Power supply 106 is a converter, and more specifically, an inverter, in the preferred embodiment. Power supply 106 is a chopper, a phase controlled power supply, a transformer based power supply, or a mag amp based power supply in alternative embodiments. Converter, as used herein, includes a power circuit that receives or provides an AC or DC signal, and converts it to the other of an AC or DC signal, or to a different frequency. Invertor, as used herein, includes a power circuit that receives or provides a DC bus that is inverted to be an AC signal. Chopper, as used herein, includes a power circuit that receives or provides a DC bus and chops the bus to provide a chopped DC output. Phase controlled power supply, as used herein, includes a power circuit that has at least one phase controlled device.

A sensor circuit 112 is included in one embodiment (but not the preferred embodiment). Sensor circuit 112 senses when the utility power 102 is present (i.e. when the power supply is connected to a utility outlet). If utility power is present (and at the right voltage, frequency and/or other parameter in one embodiment) sensor 112 causes switch 108 to be moved to the utility power position. Thus, switch 108 is not a user selectable switch in this embodiment. Sensor 112 may also detect whether or not generator power is present, and control switch 108 based on that sensed value.

Welder 100 is a single package stand-alone welder in the preferred embodiment. However, power supply 106 may be sold and/or packaged separately from engine-driven generator 104 in alternative embodiments. A single package stand-alone welder, as used herein, includes a welding power supply and a generator in a single package.

Figure 2:
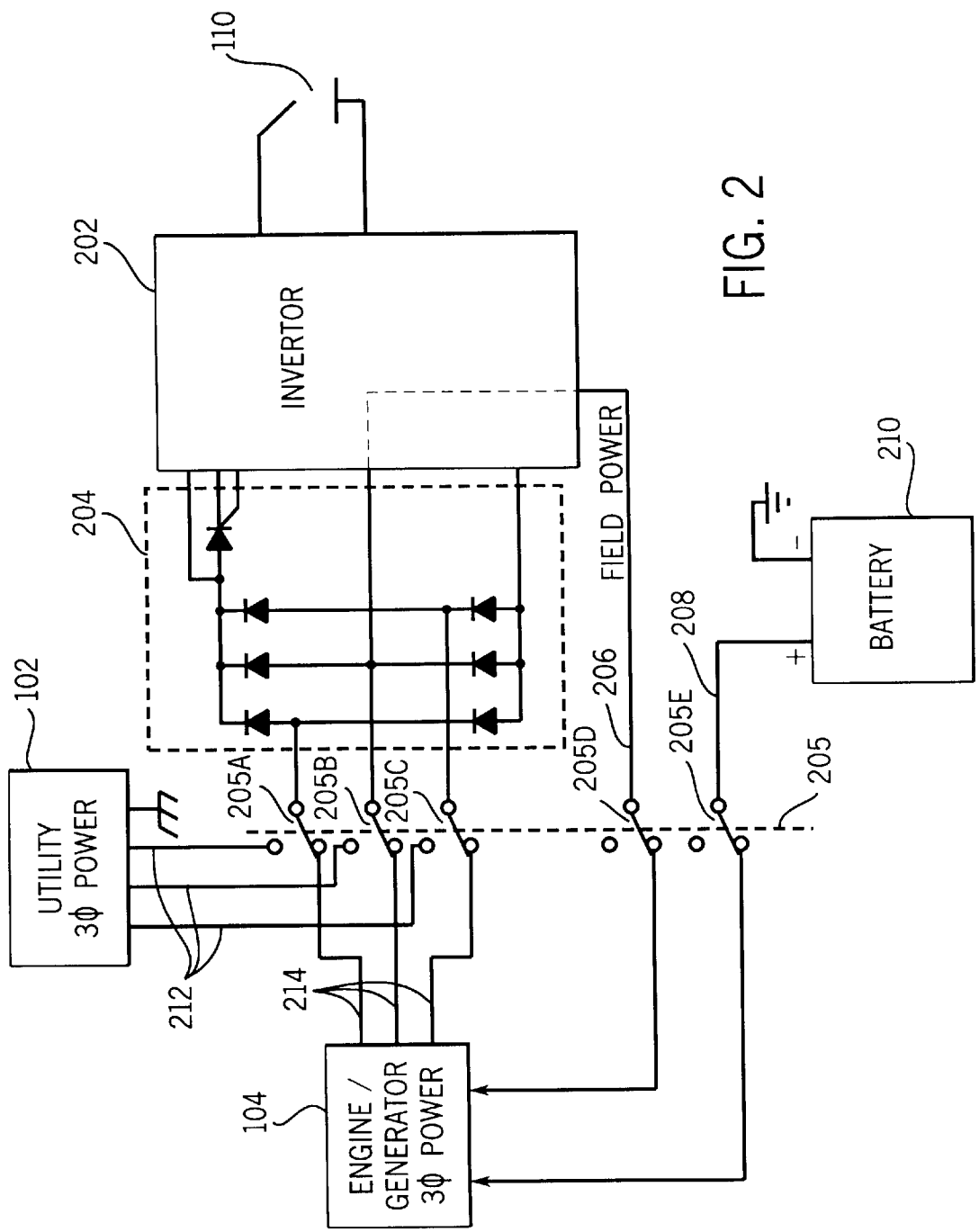
FIG. 2 is diagram of part of a welder constructed in accordance with the present invention.

A circuit diagram of one implementation of the present invention is shown in FIG. 2, and includes an inverter 202, engine/generator 104, utility power input 102, an input rectifier 204, a switch 205, a battery 210, and a pair of three phase input lines 212 and 214. Switch 205 is a user selectable switch, preferably on the front or control panel of the welder.

Switch 205 includes five sub-switches 205A–205E, and adjusting the position of switch 205 adjusts the position of each of the sub-switches. Additionally, switch 205 includes an off position, not shown on FIG. 2. Switch 205 allows the user to select whether or not to provide engine/generator three-phase power or utility three-phase power to a power supply input which includes rectifier 204. Power supply input, as used herein, refers to the circuitry which receives power, and provides that power to the power supply converter and/or transformer.

Invertor 202 has a power output, which in the preferred embodiment is the welding power output. The power supply output may also included an auxiliary power output, a plasma power output, or other power outputs. A power output, as used herein, is the output circuitry, studs, or an intermediate power stage, of a power circuit.

An input circuit includes an engine power input (generator three phase power lines 214) and a utility power input (utility three phase power lines 212), along with switches 205A–205E. Single phase engine and/or utility power is used in one alternative. Engine power input, as used herein, includes the circuitry connected to the generator, which is hard wired, or a plug in various embodiments. Utility power input, as used herein, includes the circuitry connected to the utility power, such as a plug, receptacle, lines etc. Input circuit, as used herein, includes the poles of the switch used to change modes, the engine power input, and the utility power input. Switches 205A–205C are mode select inputs, because they selectively connect one of a plurality of power inputs to the power supply input.

The user selectable portion of switch 205 on the control panel (and/or sensor 112 in alternative embodiments) is an input selector (i.e., used to select which input will be used), and includes an engine mode and a utility mode. When the user selects the engine mode switches 205A–205C are in the position shown in FIG. 2, and the engine power input (lines 214) are connected to the power supply input (rectifier 204). When the user selects the utility mode the utility power input (power lines 212) are connected to the power supply input (rectifier 204).

The mode select input and input selector are part of a single switch in the preferred embodiment—the input selector is the knob on the control panel and the mode select input is part of the switch opened and closed in respond to the knob being turned. However, in alternative embodiments they are distinct elements, such as an electronic push button (input selector) and a remote electronic switch or relay (mode select input).

One phase of the power supply input is provided through switch 205D and a field power line 206 to the field winding of the generator. The field power is required to produce a generator electrical output. When the user selectable switch is in the utility mode, switch 205D is opened, thus removing field power from engine/generator 104. Thus, by placing the user selectable switch in the utility power position, field power, and generator output, are disabled.

Additionally, switch 205B provides, through a power line 208, battery power to engine/generator 104. When the user selectable switch 205 is in the utility mode, switch 205E is opened, and battery power is removed from engine/generator 104. This prevents engine/generator 104 from being started when user selectable switch 205 is in the utility mode. Switches 205D and 205E form part of an engine control circuit (which also includes circuitry to control field magnitude, engine speed etc.) that disables engine/generator 104 when utility power has been selected. Thus, the input circuit, which includes switches 205D and 205E, provides a disable output (opening switches 205D and 205E) to an engine disable input, including a field current cut-off circuit and a battery cut-off circuit, when the user selects the utility mode.

The preferred embodiment described above provides that the input power may be switched from engine to utility without unplugging the power supply from the engine or manually turning off the engine, and with minimal interruption to the welding process. Similarly, the input power may be switched from utility to engine without unplugging the power supply from the utility source.

Numerous modifications may be made to the present invention which still fall within the intended scope hereof. Thus, it should be apparent that there has been provided in accordance with the present invention a method and apparatus for welding using either utility or generator power as an input that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welder comprising:
   a power supply, having a power supply input and a power output;
   an input circuit having an engine power input and a utility power input, and wherein one of the engine power input and the utility power input is selectively connected to the power supply input in response to a mode select input;
   an input selector, connected to the mode select input, having an engine mode and a utility mode; and
   an engine/generator having an electrical output connected to the engine power input, and having an engine disable input, and wherein the input circuit includes a disable output, and wherein the disable output is connected to the disable input when the input selector is in the utility mode.

2. The apparatus of claim 1, wherein the input selector includes a user selectable input.

3. The apparatus of claim 2, wherein the user selectable input is a user switch on a welder control panel.

4. The apparatus of claim 3, wherein the user switch is a three position switch having an engine mode position, a utility mode position and an off position.

5. The apparatus of claim 1, wherein the welder further comprises an auxiliary power output disposed to derive power from the engine/generator.

6. The apparatus of claim 1, wherein the input selector includes a sensor circuit, disposed to sense and provide the mode select input in response to the presence, absence or other parameter of utility power being provided to the utility power input.

7. The apparatus of claim 1, wherein the input selector includes a sensor circuit, disposed to sense and provide the mode select input in response to the presence, absence, or a parameter of engine power being provided to the engine power input.

8. A welder comprising:
   a power supply, having a power supply input and a power output;
   an input circuit having an engine power input and a utility power input, and wherein one of the engine power input and the utility power input is selectively connected to the power supply input in response to a mode select input;
   an input selector, connected to the mode select input, having an engine mode and a utility mode, wherein the input selector includes a user selectable input that is a user switch on a welder control panel, further wherein the user switch is a three position switch having an engine mode position, a utility mode position and an off position; and
   an engine/generator having an electrical output connected to the engine power input, and having an engine disable input, and wherein the input circuit includes a disable output, and wherein the disable output is connected to the disable input when the user switch is in the utility position.

9. The apparatus of claim 8, wherein the power supply includes an inverter.

10. The apparatus of claim 9, wherein the welder is a single-package, stand-alone, welder.

11. The apparatus of claim 8, wherein the power supply includes a chopper.

12. The apparatus of claim 8, wherein the power supply includes a phase controlled device.

13. The apparatus of claim 8, wherein the disable input includes a field current cut-off circuit, responsive to the disable output.

14. The apparatus of claim 8, wherein the disable input includes a starter cut-off circuit, responsive to the disable output.

15. The apparatus of claim 8, wherein the engine control circuit includes a battery cut-off circuit, responsive the disable output.

16. A welder comprising:
    power supply means for receiving a power supply input and providing a power supply output;
    engine power input means for providing an engine power input;
    utility power input means for providing a utility power input;
    a mode select means for selectively connecting one of the engine power input means and utility power input means to the power supply input;
    an engine/generator means for generating and providing power to the engine power input means; and
    means for disabling the engine generator, responsive to the mode select means.

17. The apparatus of claim 16, wherein the mode select means includes a user selectable input.

18. The apparatus of claim 17, wherein the mode select means includes a user switch on a welder control panel.

19. The apparatus of claim 16, wherein the mode select means includes means for sensing the presence, absence, or other parameter of utility power being provided to the utility power input, and for causing the mode select means to selectively connect.

20. A welder comprising:
    power supply means for receiving a power supply input and providing a power supply output;
    engine power input means for providing an engine power input;
    utility power input means for providing a utility power input;
    a mode select means for selectively connecting one of the engine power input means and utility power input means to the power supply input;
    wherein the mode select means includes a user selectable input that includes a user switch on a welder control panel; and
    an engine/generator means for generating and providing power to the engine power input means, and means for disabling the engine generator, and responsive to the mode select means.

21. The apparatus of claim 20, wherein the power supply means includes an inverter.

22. The apparatus of claim 20, wherein the power supply means includes a chopper.

23. The apparatus of claim 20, wherein the power supply means includes a phase controlled device.

24. The apparatus of claim 20 wherein the means for disabling includes means for disrupting field current power.

25. The apparatus of claim 20 wherein the means for disabling includes means for disrupting battery power.

26. A method of providing welding power, comprising:
    selecting an engine or utility mode;
    selecting between one of engine power input and utility power as an input power in response to the selected mode;
    converting the input power to welding power;
    generating electrical power and providing the electrical power as the engine power input, when the engine mode is selected; and
    disabling the generated electrical power when the utility mode is selected.

27. The method of claim 26, wherein selecting an engine or utility mode includes responding to a user selectable input.

28. The method of claim 27, wherein selecting an engine or utility mode includes responding to a user switch on a welder control panel.

29. The method of claim 26, further comprising sensing the presence, absence, or other parameter of utility power being provided to the utility power input.

30. The method of claim 26, further comprising sensing the presence or absence of engine power being provided to the engine power input.

31. A method of providing welding power, comprising:
    selecting an engine or utility mode;
    selecting between one of engine power input and utility power as an input power in response to the selected mode;
    disabling the one of engine power input and utility power as an input power not selected;
    converting the input power to welding power;
    wherein selecting an engine or utility mode includes responding to a user selectable input and responding to a user switch on a welder control panel;
    generating electrical power and providing the electrical power as the engine power input, when the engine mode is selected; and
    disabling the generated output, when the utility mode is selected.

32. The method of claim 31, wherein converting the input includes inverting the input.

33. The method of claim 31, wherein converting the input includes chopping the input.

34. The method of claim 31, wherein disabling the generated output includes disrupting a field current.

35. The method of claim 31, wherein disabling the generated output includes disrupting battery power.

\* \* \* \* \*